United States Patent Office 3,189,440
Patented June 15, 1965

---

3,189,440
PROCESS FOR THE PREPARATION OF PURE BISMUTH
Heinz-Günther Plust, Spreitenbach, Aargau, Switzerland, assignor to Aktiengesellschaft, Brown, Boveri & Cie, Baden, Switzerland, a joint-stock company
No Drawing. Filed May 6, 1963, Ser. No. 278,431
Claims priority, application Switzerland, May 9, 1962, 5,554/62
1 Claim. (Cl. 75—70)

In the preparation of compound semiconductors such as are used in thermo-electric applications it is essential that the starting materials be of very high purity. An example of this is bismuth which is a component of the thermo-electric material bismuth telluride ($Bi_2Te_3$). The better known methods for the purification of bismuth are by aqueous electrolysis, molten electrolysis and, in particular, a process using bismuth nitrate as starting material. In this latter method bismuth nitrate is converted to sulphide, the sulphide is oxidized with nitric acid and the resulting oxide is reduced to pure bismuth by potassium cyanide.

None of these processes, however, yields bismuth of spectral purity. It is not possible by these known processes to remove such impurities as copper and silver to a sufficiently low level that they no longer affect the properties of the semiconductors produced therefrom. The particular disadvantage of these methods is that they necessitate the use of other materials which must also be of high purity if such methods are to be effective.

It is the purpose of the present invention to provide a process for the preparation of spectrographically pure bismuth wherein the aforesaid disadvantage is avoided and by means of which such pure bismuth may be produced in considerable quantities. The method is characterized in that bismuth oxychloride is reduced in pure hydrogen at about 900° C.

The method depends on the fact that the reduction of bismuth oxychloride with hydrogen does not proceed, as expected, according to the equation:

$$2BiOCl + 3H_2 \rightarrow 2Bi + 2H_2O + 2HCl$$

but that intermediate bismuth trichloride is produced. This bismuth trichloride sublimes immediately at the temperature of the reaction (about 900° C.) and condenses on the cooler parts of the apparatus. The reaction proceeds thus according to the equation:

$$3BiOCl + 3H_2 \rightarrow 2Bi + 3H_2O + BiCl_3$$

The evaporating bismuth trichloride carries along metallic impurities as chlorides or complex compounds whereas the remaining metallic bismuth is present in a very pure form. The pure bismuth thus obtained is spectrographically free from such impurities as boron, lead, copper, silver, titanium and aluminum.

This method has one important advantage in that because the process is carried out in pure hydrogen, which can be easily obtained by purifying technical hydrogen, no further pure material or additional matter is necessary.

The preparation of the starting material bismuth oxychloride is most advantageously carried out by chlorination of raw bismuth to bismuth trichloride according to the equation:

$$2Bi + 3Cl_2 \rightarrow 2BiCl_3$$

with subsequent hydrolysis of the bismuth chloride:

$$BiCl_3 + H_2O \rightarrow BiOCl + 2HCl$$

The resulting bismuth oxychloride can be used directly in the reduction process.

When the crude bismuth has a high content of impurities, many of these impurities may be removed by purification of the bismuth trichloride produced by the chlorination before the hydrolysis. This purification of the bismuth trichloride may be suitably carried out by sublimation or zone refining. In addition to or instead of this pre-purification by sublimation, a further refining action may be effected by a partial hydrolysis of the bismuth chloride to bismuth oxychloride.

A further explanation of the process is given in the following.

For the chlorination of the bismuth a quartz tube is used which has a gas inlet at one end and a cooled collecting flask at the other end. The central section of the tube is enclosed by some form of heater such as a furnace. In the heated zone is placed a boat containing about 300 grams of bismuth. The tube is first heated to about 500° C. while passing pure nitrogen. Then a gas mixture the composition of which is 10 litres per hour of nitrogen and 20 litres per hour of chlorine is passed through the tube and the temperature is raised to 700–800° C. The bismuth and chlorine react to give bismuth trichloride which is sublimed by the nitrogen into the cooled collecting flask. When the reaction has ceased, the apparatus is allowed to cool in a nitrogen atmosphere. In this way it is possible to chlorinate 300 grams of bismuth in about 2 hours with a yield of bismuth chloride of from 94 to 98%.

The final hydrolysis is carried out by mixing the bismuth chloride with distilled water and then decanting the resulting mixture. The precipitate of bismuth oxychloride is filtered off and dried at about 130° C. The yield for this part of the process is about 97.5%.

For the reduction of the bismuth oxychloride a quartz tube is used through which a stream of pure hydrogen flows and whose centre section is surrounded by a heating element. In the heated zone a boat containing about 50 grams of bismuth oxychloride is placed.

The reduction is carried out at about 900° C. at which temperature the vapour pressure of bismuth oxychloride is still quite low. With a hydrogen flow of 30 liters per hour the reduction is completed in 15 minutes. The yield of bismuth according to the equation:

$$3BiOCl + 3H_2 \rightarrow 2Bi + 3H_2O + BiCl_3$$

is about 70%.

The resulting bismuth chloride sublimes at the reaction temperature of 900° C. and is redeposited on the cold part of the quartz tube. This bismuth chloride may be used once again in the hydrolysis process to produce bismuth oxychloride thereby materially increasing the yield of pure bismuth to over 90% so that the overall yield of pure bismuth from the raw bismuth is about 85–90%.

It is desirable to transform the approximately spherical particles of bismuth produced during the reaction into rods and this is accomplished quite simply by melting these particles in a porcelain crucible and pouring the fluid metal into a preheated hard-glass tube which is closed at its lower end.

Spectrographic analysis shows that the pure bismuth is free from boron, copper, lead, silver, titanium and aluminum and is therefore suitable for the preparation of compound semiconductors with favourable electrical properties.

I claim:

A process for the preparation of spectrally pure bismuth which comprises the following steps:
(a) chlorination of bismuth to give bismuth trichloride,
(b) hydrolysis of said bismuth trichloride to give bismuth oxychloride,
(c) reduction of said bismuth oxychloride with pure hydrogen at about 900° C.

References Cited by the Examiner

Mellor: Comprehensive Treatise on Inorganic and Theoretical Chemistry, vol. IX, Longmans, Green and Co., N.Y., 1929, pages 660–664.

Parr: Zone Refining and Applied Techniques, George Newnes Limited, Strand, England, page 171.

BENJAMIN HENKIN, *Primary Examiner.*

DAVID L. RECK, *Examiner.*